Nov. 27, 1962  L. G. FISCHER  3,066,257
FREQUENCY ANALYSIS AND MEASUREMENT SYSTEM
Filed April 20, 1953  3 Sheets-Sheet 1

INVENTOR
LAURIN G. FISCHER
BY
Ernest Fanwick
ATTORNEY

Nov. 27, 1962 L. G. FISCHER 3,066,257
FREQUENCY ANALYSIS AND MEASUREMENT SYSTEM
Filed April 20, 1953 3 Sheets-Sheet 2
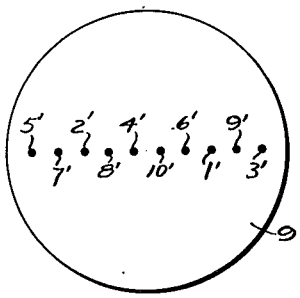
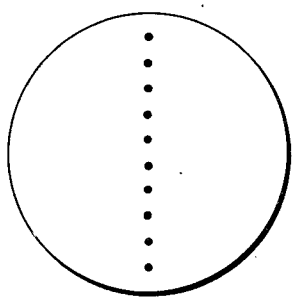
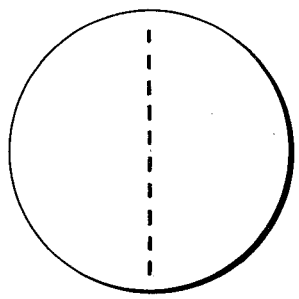
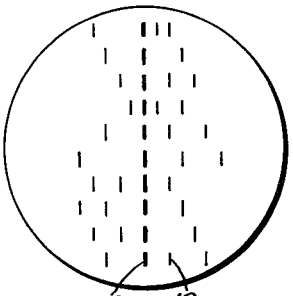
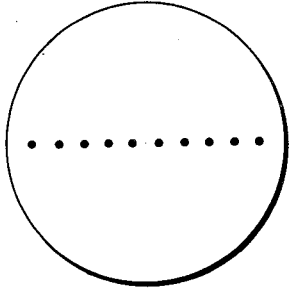
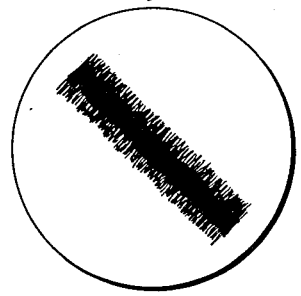
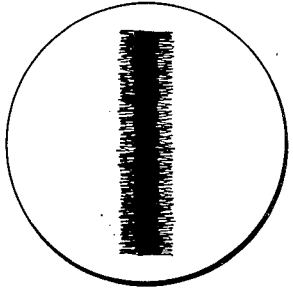
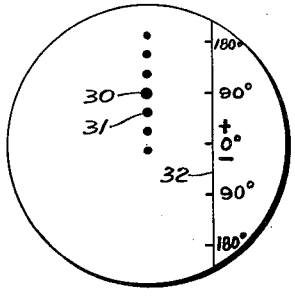
INVENTOR
*LAURIN G. FISCHER*
BY
*Ernest Fanwick*
ATTORNEY Nov. 27, 1962 L. G. FISCHER 3,066,257
FREQUENCY ANALYSIS AND MEASUREMENT SYSTEM
Filed April 20, 1953 3 Sheets-Sheet 3
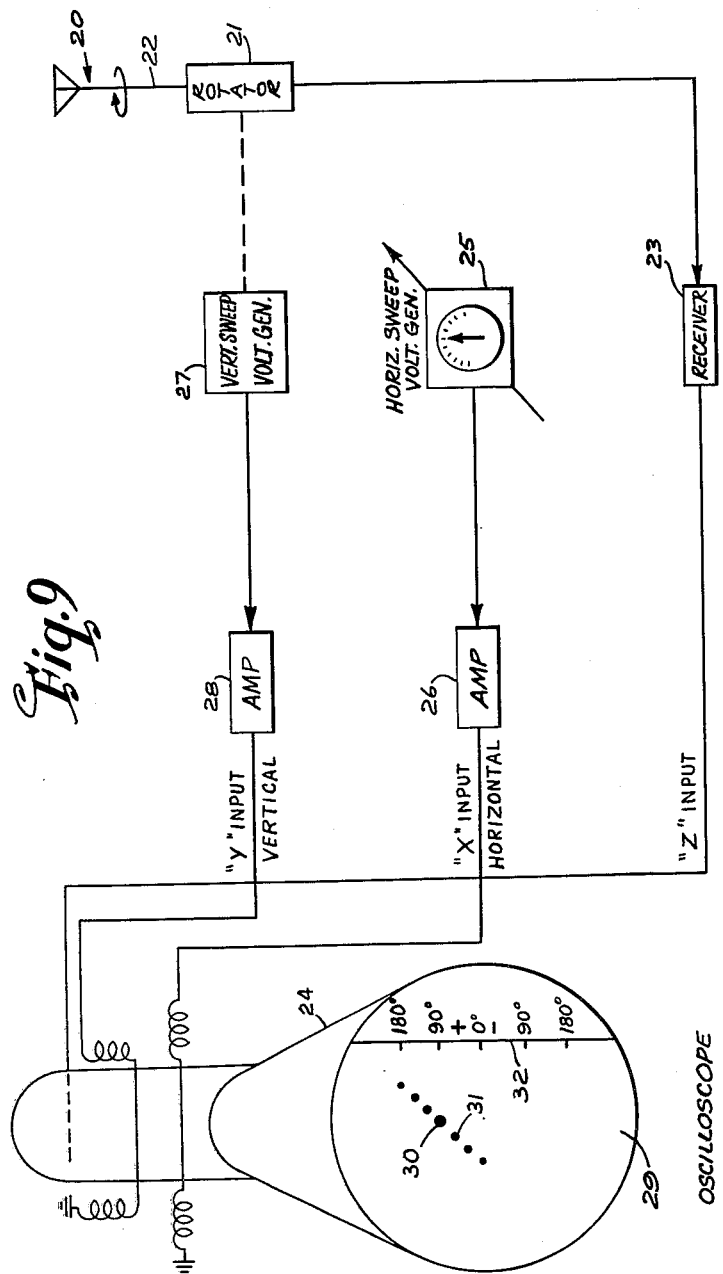
INVENTOR
*LAURIN G. FISCHER*
BY
ATTORNEY

United States Patent Office 3,066,257
Patented Nov. 27, 1962

3,066,257
FREQUENCY ANALYSIS AND MEASUREMENT
SYSTEM
Laurin G. Fischer, North Arlington, N.J., assignor to International Telephone and Telegraph Corporation, a corporation of Maryland
Filed Apr. 20, 1953, Ser. No. 349,967
11 Claims. (Cl. 324—79)

This invention relates to means and methods of frequency analysis and more particularly to means and methods of frequency analysis utilizing a cathode ray tube.

The use of cathode ray tubes, particularly cathode ray tube oscilloscopes, for determining the frequency of a periodic signal having an unknown repetition rate is well-known to those skilled in the art. In the past the periodic signal has usually been coupled to the "X" or horizontal deflection plates of the cathode ray tube and a vertical sweep voltage was coupled to the "Y" or vertical deflection plates or vice versa. In the absence of any synchronization between the sweep frequency on the one axis and the repetition rate of the periodic signal input on the other axis a confusion of patterns is observed as the signal sweeps along the cathode ray tube face. It is difficult for the operator to adjust the local sweep voltage frequency to correspond to the input signal frequency without knowing in advance whether to raise or lower the sweep rate to correspond with the input signal repetition rate. When the input signal comprises a plurality of repetitive narrow pulses having a poor signal-to-noise ratio it is almost impossible to adjust the sweep voltage frequency to correspond with the input signal pulse repetition rate. Even under the best conditions, the known methods of frequency analysis utilizing cathode ray tubes have yielded very little information about the input signal.

One of the objects of this invention, therefore, is to provide means and methods of making a frequency analysis of a periodic signal, having an unknown repetition rate utilizing a cathode ray tube, more quickly and easily.

Another object of this invention is to provide means and methods for making a frequency analysis of an input signal under conditions of random disturbances.

A further object of this invention is to provide means and methods for obtaining a maximum quantity of information about a periodic input signal having an unknown repetition rate from a cathode ray tube display of said input signal.

One of the features of this invention is the method of frequency analysis of an input periodic signal having an unknown repetition rate utilizing a cathode ray tube oscilloscope wherein the input signal intensity modulates the electron beam of the cathode ray tube. A horizontal sweep voltage of known frequency deflects the electron beam in a horizontal direction. A vertical sweep voltage frequency is coupled to the vertical deflection plates to deflect the electron beam in the "Y" or vertical axis. The horizontal sweep voltage frequency is so related to the vertical sweep voltage frequency that each horizontal sweep of the electron beam is vertically displaced creating a raster type of presentation. The horizontal sweep frequency is adjusted to cause each of the input signals to align itself relative to the other input signals, thus enabling an operator to intelligently vary the horizontal sweep control to equate the horizontal sweep frequency to the repetition rate of the input periodic signal.

Another feature of this invention is the use of a rotating directional antenna to pick up pulsed periodic signals of unknown repetition rate. The signals picked up by the rotating directional antenna intensity modulate the electron beam of a cathode ray tube. The electron beam is displaced along a vertical axis at a vertical sweep frequency equal to the rotational rate of the directional antenna while a horizontal sweep voltage of adjustable frequency is coupled to the horizontal deflection means of the cathode ray tube. By adjusting the horizontal sweep frequency to vertically align the input signal pulses and determining the pulse of maximum intensity the repetition rate and direction of reception of the input periodic pulsed signals may be determined quickly and easily.

The above-mentioned and other features and objects of this invention will become more apparent by reference to the following description taken in conjunction with the accompanying drawings, in which:

FIGS. 2-8 and 10 are pictorial illustrations of cathode ray tube face displays helpful in the explanation of this invention; and FIG. 9 is a schematic diagram in block form of a system for determining the frequency and direction of reception of a pulsed signal of unknown repetition rate in accordance with the principles of this invention.

Figure 1:
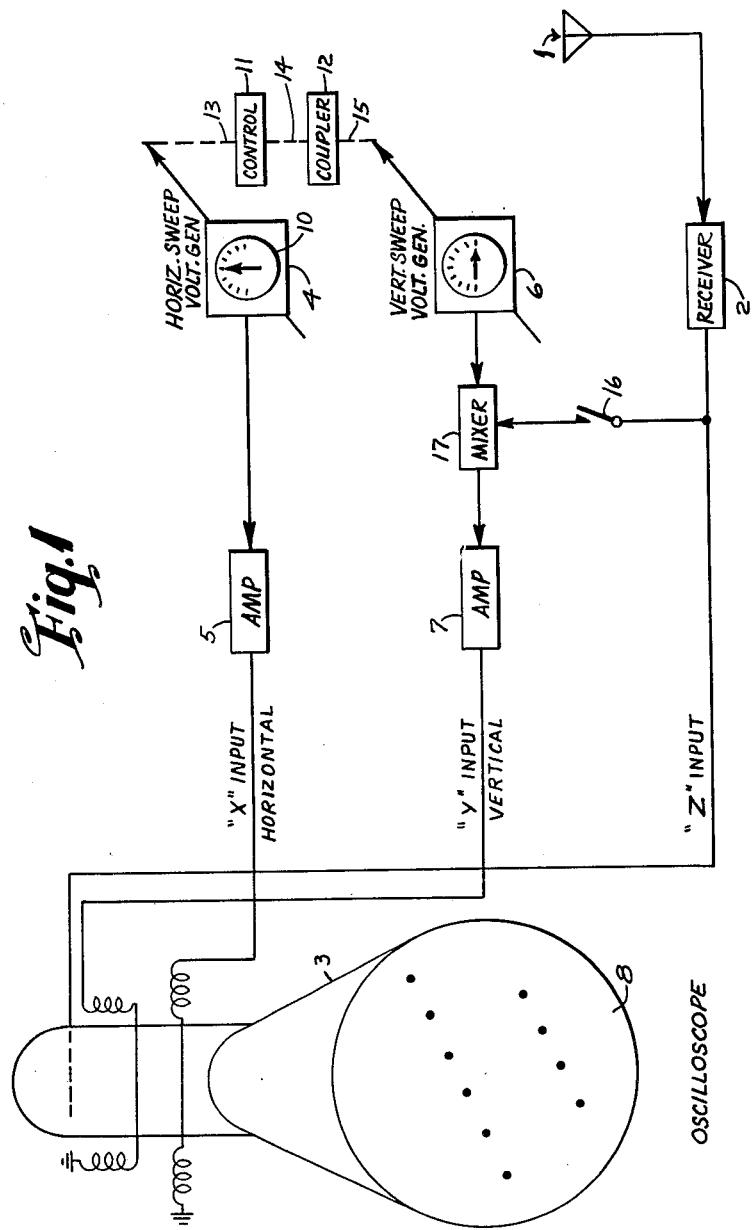
FIG. 1 is a schematic circuit diagram in block form of one system for determining the frequency of an input periodic signal of unknown repetition rate, in accordance with the principles of this invention.

Referring to FIG. 1 of the drawing, a system for determining the frequency of a periodic signal having an unknown repetition rate in accordance with the principles of this invention is shown, wherein for purposes of clarity and explanation it may be assumed that an unknown signal comprising a plurality of periodic pulses having a given frequency is picked up by an omni-directional antenna 1. It will, of course, be understood that the principles of the present invention are applicable to any type of signal as hereinafter explained.

The pulsed signal pickup by omni-directional antenna 1 is coupled to a receiver 2 which detects the incoming pulsed signal. The output of the receiver 2 is coupled to a usual cathode ray tube or cathode ray tube oscilloscope 3. The cathode ray tube oscilloscope 3, as will be understood by those skilled in the art, comprises a glass envelope having means to display the impinging electrons emitted by an electron gun arrangement on its face. In addition, means are provided to deflect and modulate the electron beam prior to its display on the face of the tube. A plurality of input connections are provided comprising an "X" axis input which deflects the electron beam along a horizontal axis, a "Y" input which deflects the electron beam along a vertical axis and a "Z" input which intensity modulates the electron beam. The process of marking by increasing the intensity of the electron beam trace on the face of the cathode ray tube at certain prescribed instants is accomplished by increasing the electron beam density. Either the cathode of the electron gun or the control grid voltage may be varied in such a manner as to increase the number of electrons in the electron beam. When the electron beam is increased in density the intensification produces a trace or dot of greater diameter on the face of the tube.

The pulsed signal picked up by antenna 1 and detected by receiver 2 is coupled to the "Z" axis to intensity modulate the electron beam. A horizontal sweep voltage frequency generator 4 provides a deflection voltage for the "X" or horiztontal axis of the cathode ray tube and is coupled to the "X" input terminals through amplifier 5. A vertical sweep voltage frequency generator 6 provides a voltage to deflect the electron beam along a vertical axis and has its output coupled to the "Y" axis terminals through amplifier 7. Although the vertical sweep voltage frequency from generator 6 may be random in rate, I have found that in certain applications it is preferable that the vertical sweep voltage frequency should be so chosen that it is an exact sub-multiple of the horizontal sweep voltage frequency rate from generator 4, thus providing on the screen of the cathode ray tube oscilloscope 3 a frame which remains steady. The most usable display on the face 8 of the cathode ray tube is obtained when a large number of horizontal sweeps is used, such as is obtained when a horizontal to vertical sweep voltage frequency ratio of at least 10 to 1 is used.

Referring to FIG. 2, in the known "A" scope (timebase) presentations of frequency analysis systems utilizing cathode ray tubes, there is at first no synchronization between the incoming unknown signal frequency and the horizontal sweep voltage rate. The incoming pulse signals are displayed on the face 9 of the cathode ray tube in a random order dependent upon the ratio between the horizontal sweep frequency and the pulse repetition frequency. Thus, as shown in FIG. 2, the display of the first pulse 1' has no apparent relation to the display of the second pulse 2', and the display of the second pulse 2' has no apparent relation to the display of the third pulse 3', etc. Of course, it is known that when the horizontal sweep voltage frequency is so adjusted that it equals the repetition rate of the incoming signal pulses, the pulses displayed on the face of the tube will all be superimposed, thus enabling the operator to recognize the condition of equality between the horizontal sweep voltage frequency and the incoming signal pulse repetition rate; however, when the condition of equality does not exist, as is represented by the display shown in FIG. 2, the operator has great difficulty in determining whether to raise or lower the horizontal sweep frequency in order to equate it to the pulse repetition frequency. It is only in an emperical manner that the operator can adjust the horizontal sweep frequency so that it will equal the pulse repetition rate of the incoming signal.

Referring again to FIG. 1, if the ratio of the horizontal sweep voltage frequency from generator 4 is ten times greater than the vertical sweep voltage frequency from generator 6 the ten successive horizontal sweeps of the electron beam will be vertically displaced and a raster will be obtained on the face 8 of the cathode ray tube wherein each horizontal sweep will probably contain a single input signal pulse. It now becomes obvious to the operator by merely glancing at the display on the face 8 of the cathode ray tube that he might raise the horizontal sweep voltage frequency from generator 4 in order to vertically align the input signal pulses. When the horizontal sweep frequency is so adjusted that it is equal to the pulse repetition frequency of the input signal, the signal pulses appear in vertical alignment as shown in FIG. 3, and the horizontal sweep voltage frequency equals the unknown repetition rate of the input signal. The horizontal sweep voltage frequency generator 4 is calibrated by means of dial 10 so that when the pulses appear in vertical alignment as in FIG. 3 the operator need only read the setting on dial 10 of generator 4 to determine the repetition rate of the input signal. When it is desirable to maintain a steady frame on the face of the cathode ray tube 8 it is necessary that the vertical sweep voltage frequency from generator 6 be maintained at the same sub-multiple of the horizontal sweep voltage frequency as the horizontal sweep voltage frequency is varied; thus, in order to maintain the raster shown on the face 8 of the cathode ray tube in FIG. 1 and shown in FIG. 3, it is necessary that the ratio of the horizontal sweep voltage frequency to the vertical sweep voltage frequency be maintained at 10 to 1. This maintenance of the ratio of sweep frequencies is accomplished by controlling both the horizontal generator 4 and the vertical generator 6 from one control 11. By completing coupler 12 control 11 is mechanically coupled via linkages 13, 14, and 15 to the variable elements in generators 4 and 6 which are so designed that as the frequency of generator 4 is varied by a factor of 10 the frequency output of generator 6 is varied by a factor of 1. It will, of course, be obvious to those skilled in the art that gear arrangements may be included in the mechanical linkage to provide for other ratios of horizontal to vertical sweep voltage frequency as well as electronic counters, dividers, triggers, and other means which are available for this purpose. The presentation displayed on the face of a cathode ray tube as hereinbefore explained presents a pattern in such a manner that the operator of the frequency analysis equipment of this invention may intelligently control the horizontal sweep voltage frequency to synchronize the horizontal sweep rate with the unknown repetition rate of the incoming signal and thus in effect allowing this adjustment of the horizontal sweep rate to be made rapidly, simply, and efficiently.

Referring again to FIG. 1, the vertical pattern alignment of the signal pulses displayed on the face 8 of the cathode ray tube oscilloscope may be more easily recognized by an operator if a portion of the output of receiver 2 is coupled through switch 16 to a mixer 17 where it is combined with the output of the vertical sweep voltage frequency generator 6 and coupled through vertical amplifier 7 to deflect the electron beam along the "Y" axis. By coupling a portion of the signal to the "Y" axis each signal pulse appears on the face of the tube as a bar as shown in FIG. 4 instead of as a dot. It can be readily appreciated that the vertical alignment of bars is far more easily recognized than the vertical alignment of dots shown in FIG. 3. This is especially true if, as quite often happens, the periodic signal input to the cathode ray tube is immersed in random disturbances such as noise which are picked up along with the incoming signal. At present, utilizing known methods of frequency analysis such random noise conditions make it almost impossible for an operator to obtain the pulse repetition frequency of the incoming signal. However, by utilizing the principles of this invention an operator is able to adjust the horizontal sweep voltage frequency and the vertical alignment of the incoming pulse signals 18 is still very noticeable, as shown in FIG. 5 and very distinguishable from the random noise pulses 19. This distinguishable vertical pattern of signal pulses 18 is easily recognized and enables an analysis of the incoming signal to be made under extremely poor conditions of signal-to-noise ratio.

If it is desired to obtain a pulse repetition frequency more quickly, the horizontal and vertical sweep generators 4 and 6 can be controlled from a single control knob 11 such that their sweep frequencies for any setting of knob 11 are non-related. For example, if it is desired to sweep the frequency range of from 1,000–2,000 pulses per second the frequency of the horizontal sweep generator 4 can be made to vary from 1,000–1,600 cycles per second while the vertical sweep generator 6 has its frequency simultaneously varied from 1,400 to 2,000 cycles per second. If the incoming pulse repetition rate coincides with the horizontal sweep voltage frequency, a vertical display of pulses is obtained as shown in FIG. 3. If the vertical sweep voltage frequency is synchronized with the pulse repetition frequency of the incoming signal, a horizontal display of pulses is obtained as shown in FIG. 6 and thus the proper pulse repetition rate may be determined by the operator from whether a horizontal or vertical alignment of pulses is obtained on the face of the cathode ray tube. This enables the operator to determine the repetition frequency in a very quick and efficient manner since only a portion of the spectrum need be scanned by any one sweep voltage generator.

If the incoming signal has a carrier frequency voltage, lying anywhere in the frequency spectrum between the usual audio frequencies and the upper frequency capabilities of the oscilloscope, and the sweep frequency generators 4 and 6 are not in synchronism with the carrier frequency the display on the face of the cathode ray tube will comprise a linear portion of great intensity having its boundary edges of less intensity as shown in FIG. 7.

As the horizontal sweep generator 4 is adjusted in frequency the slope of the display on the face of the cathode ray tube will shift. A condition of equality between the horizontal sweep frequency and the incoming signal repetition rate is obtained when the display on the face of the cathode ray tube is vertical as shown in FIG. 8.

Referring to FIG. 9, a schematic circuit diagram in block form of one system for obtaining a maximum quantity of information from a signal analysis on the face of a cathode ray tube in accordance with the principles of this invention is shown wherein a rotating directional antenna 20 is caused to rotate at a steady rate by rotator 21 and mechanical linkage 22. The signals picked up by rotating antenna 20 are coupled through a receiver 23 to the "Z" axis input to intensity modulate the electron beam of cathode ray tube oscilloscope 24 and a horizontal sweep voltage generator 25 of adjustable frequency has its output coupled through amplifier 26 to the "X" axis input of oscilloscope 24 to deflect the electron beam in the horizontal direction. A vertical sweep frequency generator 27 is synchronized by rotator 21 to emit a signal having a frequency equal to the frequency of the antenna 20 rotation. The vertical sweep frequency at the antenna rotation rate is coupled through amplifier 28 to the "Y" axis input to deflect the electron beam in the vertical direction. If the signals picked up by antenna 20 are strongest in the +90° azimuth direction and there is no synchronism between horizontal sweep generator 25 and the incoming signal pulse repetition rate, the face 29 of the cathode ray tube in oscilloscope 24 will display a plurality of pulses of varying intensity. When antenna 20 is aligned with the source of the incoming signal pulses the strongest signal pulse will be coupled to the "Z" axis input causing that pulse to be of greatest intensity. If the antenna departs from direct alignment of source of the incoming signals, the pulses 31 displayed on the face 29 of the cathode ray tube will gradually decrease in intensity. The operator must adjust the horizontal sweep voltage frequency generator 25 until the sweep frequency is substantially equal to the repetition rate of the incoming signal and this condition will be indicated by a vertical alignment of pulses of varying intensity as shown in FIG. 10. By properly calibrating the face of the cathode ray tube to a scale 32, the operator can determine the direction of the transmitted signal by reading the azimuth direction from scale 32 of the pulse having the greatest intensity. This method will provide one other bit of information about the incoming signal to the operator than methods heretofore used. Of course, it becomes obvious to those skilled in the art that some other variables such as carrier frequency or audio frequency may be utilized to synchronize the vertical sweep voltage generator.

It will be obvious to those skilled in the art that the principles of polar display (PPI) are applicable to my invention by transforming the horizontal sweep into an equivalent radial sweep and transforming the vertical sweep into an equivalent rotational sweep.

While I have described above the principles of my invention in connection with specific apparatus, it is to be clearly understood that this description is made only by way of example and not as a limitation to the scope of my invention as set forth in the objects thereof and in the accompanying claims.

I claim:

1. The method of determining the repetition frequency of a periodic signal having an unknown repetition frequency comprising the steps of intensity modulating the electron beam of a cathode ray tube by said periodic signal, deflecting said electron beam along a given axis responsive to a variable sweep voltage of known frequency, deflecting said electron beam along a second axis and adjusting said variable sweep voltage frequency to cause said intensity modulated signal to fall in alignment along said second axis whereby said variable sweep voltage frequency is substantially equal to the repetition frequency of said periodic signal.

2. The method of determining the repetition frequency of a periodic pulsed signal having an unknown repetition frequency comprising the steps of intensity modulating the electron beam of a cathode ray tube by said pulsed signal, deflecting said electron beam along a horizontal axis responsive to a horizontal variable sweep voltage of known frequency and deflecting said electron beam along a vertical axis responsive to a vertical sweep voltage having a frequency less than the frequency of said horizontal sweep voltage and adjusting said horizontal sweep voltage frequency to cause said intensity modulated signal pulses to fall into vertical alignment whereby said horizontal sweep voltage frequency is substantially equal to the repetition frequency of said periodic pulsed signal.

3. A method according to claim 2 wherein the ratio of said horizontal sweep voltage frequency to said vertical sweep voltage frequency is greater than 10 to 1.

4. The method according to claim 2 wherein a portion of said periodic signal is caused to deflect said electron beam in the vertical direction responsive to said signal pulses as said electron beam sweeps along the horizontal axis.

5. The method of determining the repetition frequency of a periodic signal having an unknown repetition frequency within a given frequency spectrum comprising the steps of intensity modulating the electron beam of a cathode ray tube by said periodic signal, deflecting said electron beam along a horizontal axis responsive to a horizontal variable sweep voltage frequency, deflecting said electron beam along a vertical axis responsive to a vertical variable sweep voltage frequency, adjusting said horizontal variable sweep voltage frequency to scan the lower portion of said given frequency spectrum, adjusting said vertical variable sweep voltage frequency to scan the upper portion of said frequency spectrum, and adjusting said horizontal and vertical sweep voltage frequencies to cause said signal pulses to fall into alignment whereby the repetition frequency of said periodic signal is determined.

6. A system for determining the repetition frequency of a periodic signal having an unknown repetition frequency comprising a cathode ray tube including electron beam forming means, means to intensity modulate said electron beam and means to horizontally and vertically deflect said electron beam, a source of said periodic signal, means to couple said periodic signal to said intensity modulating means to form a plurality of signal impulses on the face of said cathode ray tube, a source of horizontal sweep voltage having an adjustable frequency, means to couple the output of said source of horizontal sweep voltage to said horizontal deflecting means, a source of vertical sweep voltage having a frequency less than said horizontal sweep voltage frequency, means to couple said vertical sweep voltage to said vertical deflecting means, and means to adjust said horizontal sweep voltage frequency to cause said signal impulses to fall into vertical alignment upon the face of said tube whereby said horizontal sweep voltage frequency equals said periodic signal repetition frequency.

7. A system according to claim 6 which further includes means to couple a portion of said periodic signal to said vertical deflecting means.

8. A system for determining the repetition frequency of a periodic signal having an unknown repetition frequency within a given frequency spectrum comprising a cathode ray tube having an electron beam forming means, means to intensity modulate said electron beam, means to horizontally and vertically deflect said electron beam, a source of said periodic signal, means to couple said periodic signal to said intensity modulating means to form a plurality of signal impulses on the face of said cathode ray tube, a source of horizontal sweep voltage having an adjustable frequency, means to couple the output of said horizontal sweep voltage to said horizontal deflecting means, a source of vertical sweep voltage having an adjustable frequency, means to couple said vertical sweep voltage to said vertical deflecting means, means to cause said horizontal sweep voltage frequency to vary through one portion of said frequency spectrum, means to cause said vertical sweep voltage frequency to vary through the remainder of said frequency spectrum whereby said horizontal sweep voltage frequency is substantially equal to the repetition frequency of said periodic signal when said signal impulses fall into vertical alignment on the face of said tube and said vertical sweep voltage frequency is substantially equal to the repetition frequency of said periodic signal when said signal impulses fall into horizontal alignment on the face of said tube.

9. A system according to claim 8 wherein said means to vary said horizontal and vertical sweep voltage frequencies are responsive to a single control.

10. A system for determining the repetition frequency and direction of transmission of a periodic signal having an unknown repetition frequency comprising a directional antenna, means to cause said directional antenna to rotate at a constant frequency, a cathode ray tube including an electron beam forming means, means to intensity modulate said electron beam, first and second means to deflect said electron beam, means to detect the signal picked up by said rotating antenna, means to couple said detected signal to said intensity modulating means to form a plurality of signal impulses on the face of said cathode ray tube, a first source of sweep voltage having an adjustable frequency, means to couple the output of said first source of sweep voltage to said first deflecting means, a second source of sweep voltage having a frequency equal substantially to said antenna rotation rate, means to couple said second sweep voltage to said second deflecting means, and means to vary said first sweep voltage frequency to cause said signal impulses to form a predetermined alignment on the face of said tube whereby said periodic signal repetition frequency is determined by the frequency of said first sweep voltage and the direction of transmission of said signal is detected by the location of the strongest signal pulse relative to said second sweep of said electron beam.

11. A system for determining the repetition frequency and direction of transmisison of a periodic signal having an unknown repetition frequency comprising a directional antenna, a cathode ray tube including an electron beam forming means, means to intensity modulate said electron beam, first and second means to deflect said electron beam, a source of said periodic signal, means to couple said periodic signal to said intensity modulating means to form a plurality of signal impulses on the face of said cathode ray tube, a first source of sweep voltage having an adjustable frequency, means to couple the output of said first source of sweep voltage to said first deflecting means, a second source of sweep voltage having a frequency less than said first sweep voltage frequency, means to couple said second sweep voltage to said second deflecting means, and means to adjust said first sweep voltage frequency to cause said signal impulses to fall into an alignment upon the face of said tube whereby said first sweep voltage frequency equals said periodic signal repetition frequency.

References Cited in the file of this patent

UNITED STATES PATENTS

| | | |
|---|---|---|
| 2,110,746 | Tolson | Mar. 8, 1938 |
| 2,378,612 | Woerner | June 19, 1945 |
| 2,406,358 | Doba | Aug. 17, 1946 |
| 2,414,096 | Dimond | Jan. 14, 1947 |
| 2,470,464 | Bowie | May 17, 1949 |
| 2,483,140 | Higham | Sept. 27, 1949 |
| 2,520,141 | Hardy | Aug. 29, 1950 |
| 2,520,693 | Roberts | Aug. 29, 1950 |
| 2,525,893 | Gloess | Oct. 17, 1950 |
| 2,556,211 | Page | June 12, 1951 |
| 2,565,839 | Broadwell et al. | Aug. 28, 1951 |
| 2,614,221 | Moll | Oct. 14, 1952 |
| 2,645,711 | Hardy | July 14, 1953 |

FOREIGN PATENTS

| | | |
|---|---|---|
| 566,026 | Great Britain | Dec. 11, 1944 |